United States Patent
Noda et al.

(10) Patent No.: US 6,230,505 B1
(45) Date of Patent: May 15, 2001

(54) HEAT PUMP TYPE AIR CONDITIONING SYSTEM FOR AUTOMOTIVE VEHICLE

(75) Inventors: Yoshitoshi Noda; Hiroyuki Yamaguchi; Toshio Ohashi; Kaoru Kamiyama; Tadayoshi Tajima; Toshiharu Watanabe; Yasuhito Okawara; Hiroki Yoshioka, all of Tochigi (JP)

(73) Assignee: Calsonic Kansei Corporation, Tokyo (JP)

( * ) Notice: Subject to any disclaimer, the term of this patent is extended or adjusted under 35 U.S.C. 154(b) by 0 days.

(21) Appl. No.: 09/479,882

(22) Filed: Jan. 10, 2000

Related U.S. Application Data

(62) Division of application No. 08/970,806, filed on Nov. 14, 1997, now Pat. No. 6,125,643.

(30) Foreign Application Priority Data

| Nov. 15, 1996 | (JP) | ................................................ 8-304937 |
| Jan. 9, 1997 | (JP) | ................................................ 9-1992 |
| Oct. 23, 1997 | (JP) | ................................................ 9-291044 |

(51) Int. Cl.$^7$ .................................................. B60H 1/00
(52) U.S. Cl. .......................... 62/159; 62/238.6; 62/244; 62/323.4; 165/203
(58) Field of Search ............................. 62/159, 160, 149, 62/174, 196.1, 196.3, 196.4, 197, 238.6, 238.7, 244, 229, 323.4, 324.1, 324.6; 165/202, 203, 204, 205, 42, 43, 240, 241, 242

(56) References Cited

U.S. PATENT DOCUMENTS

| 5,003,788 | * | 4/1991 | Fischer | ............................. 62/238.6 X |
| 5,157,933 | | 10/1992 | Brendeli | ............................. 62/196.4 |
| 5,499,511 | | 3/1996 | Hara et al. | ............................. 62/180 |
| 5,598,887 | | 2/1997 | Ikeda et al. | ............................. 62/324.6 X |
| 5,641,016 | * | 6/1997 | Isaji et al. | ............................. 62/238.6 X |
| 5,651,258 | | 7/1997 | Harris | ............................. 62/196.4 X |
| 5,706,664 | | 1/1998 | Hara | ............................. 62/196.4 X |

FOREIGN PATENT DOCUMENTS 2-500677   3/1990   (JP) .

(List continued on next page.)

Primary Examiner—Harry B. Tanner
(74) Attorney, Agent, or Firm—Foley & Lardner

(57) ABSTRACT

A heat pump type air conditioning system (A) for an automotive vehicle. The heat type air conditioning system (A) comprises a first unit (10) including a heater core (11) through which an engine coolant of an engine flows, and a first heat exchanger (12) which forms part of a refrigeration cycle including a compressor (1) and a first condenser (3), in which a refrigerant circulates in the refrigeration cycle. A second unit (20) is provided including a second condenser (21) and a second heat exchanger (22) which are fluidly connected in parallel with the first heat exchanger (12). A valve (V2) is fluidly connected in series with the second condenser (21) and disposed such that a part of the refrigerant is introduced through the valve into the second condenser (21) and the second heat exchanger (22). A sub-heat exchanger (30) is disposed outside the first and second units and fluidly connected in series with the second heat exchanger (22), in which the refrigerant flowing from the second heat exchanger (22) is introduced into the sub-heat exchanger to be heated by a part of the engine coolant, the refrigerant discharged from the sub-heat exchanger being returned to the compressor. An electromagnetic clutch (40) is provided such that the compressor (1) is drivably connectable with the engine therethrough. The electromagnetic clutch is engaged to establish a driving connection between the compressor so as to operate the compressor and disengaged to cut the driving connection so as to make the compressor inoperative. A control device (C) is operatively connected to the electromagnetic clutch (40) for controlling the electromagnetic clutch to be disengageable in accordance with a temperature within the air conditioning system (A).

2 Claims, 8 Drawing Sheets

FOREIGN PATENT DOCUMENTS

| | | |
|---|---|---|
| 5-201243 | 8/1993 | (JP) . |
| 7-101227 | 4/1995 | (JP) . |
| 7-132728 | 5/1995 | (JP) . |
| 8-295117 | 11/1996 | (JP) . |
| 9-109669 | 4/1997 | (JP) . |

* cited by examiner

HEAT PUMP TYPE AIR CONDITIONING SYSTEM FOR AUTOMOTIVE VEHICLE

This is a division of application Ser. No. 08/970,806, filed Nov. 14, 1997 now U.S. Pat. No. 6,125,643.

BACKGROUND OF THE INVENTION

1. Field of the Invention

This invention relates to improvements in a heat pump type air conditioning system for an automotive vehicle in which a passenger compartment is heated and refrigerated under the action of engine coolant and refrigerant, and more particularly to the improvements to solve various problems encountered in conventional similar heat pump type air conditioning systems so as to offer the heat pump type air conditioning system suitable for practical use.

2. Description of the Prior Art

Hitherto, heat pump type air conditioning systems have been developed for automotive vehicles. Such air conditioning systems carry out both refrigeration and heating for a passenger compartment under cycle operations using a refrigerant. The air conditioning systems include a sub-condenser or interior heat exchanger disposed inside the passenger compartment, in which high temperature and pressure refrigerant from a compressor is introduced into the sub-condenser so as to be used as a heat source for heating the passenger compartment. A main condenser or exterior heat exchanger is disposed outside the passenger compartment. Additionally, a four-way valve is provided to change over flow of the refrigerant from the sub-condenser to the main condenser and vise versa to accomplish a changeover between a refrigeration operation and a heating operation of the air conditioning system. More specifically, the refrigerant discharged from the compressor is introduced to the main condenser during the refrigeration operation, whereas the refrigerant is directly introduced to the sub-condenser through a bypass passage which is formed bypassing the main condenser.

Such heat pump type air conditioning systems have been recently mounted on a part of high quality cars and so-called one box-type cars having a relatively large space, in which they a so-called dual air conditioning type including a front unit for air-conditioning a front region (for example, a front seat part) of the passenger compartment and a rear unit for air-conditioning a rear region (for example, a rear seat part) of the passenger compartment. Accordingly, the front and rear regions of the passenger compartment can be independently air-conditioned so as to achieve a comfortable air conditioning for the passenger compartment. Such air conditioning systems operate as follows: During the heating operation of the air conditioning system, the front unit uses engine coolant as a heat source while the rear unit uses as a heat source a high temperature and pressure refrigerant which is compressed by the compressor. Such air conditioning systems are arranged to pump up heat from the low temperature outside air in the circulating process or refrigeration cycle of the refrigerant and uses it to heat the passenger compartment.

Such air conditioning systems encounter with problems in case of carrying out the heating operation of the passenger compartment of the automotive vehicle. For example, when the temperature of the outside air is low, for example, in the morning in winter, the temperature of the engine coolant is low at the engine starting, and the temperature rise of the refrigerant is not sharp. Consequently, it is difficult to put the air conditioning system into such a state as to blow warm air into the passenger compartment simultaneously with the starting of operation of the air conditioning system, so that the air conditioning system is low in quick or instant heating ability and is low in heating performance. Particularly in the one-box type cars which provided with a diesel engine and are large in space of the passenger compartment, the rate of temperature rise of the engine coolant is low as compared with automotive vehicles provided with a usual gasoline engine while it is required to heat the large space, and therefore there is such a tendency as to be low in quick heating ability and heating performance for the passenger compartment. In view of this, a heat pump type air conditioning system of the following type has now been proposed: The refrigerant is heated under the action of heat of the coolant for a driving system in an electric vehicle thereby to be increased in enthalpy and becoming high in temperature. Accordingly, the thus heated refrigerant exhibits a high heating ability of the air conditioning system. Such a heat pump type air conditioning system is disclosed in Japanese Patent Provisional Publication No. 7-101227.

Thus, the various heat pump type air conditioning systems and improvements therefor have been developed and proposed.

However, the above-discussed heat pump type air conditioning systems have encountered a variety of drawbacks which will be discussed below. That is, it is usual to carry out an on-off control of the compressor by making an on-off control of a magnetic clutch (disposed between the compressor and an engine) in accordance with the discharge pressure of the compressor in order to protect the compressor from its breakage when the discharge pressure of the compressor excessively rises. The discharge pressure of the compressor is detected by a pressure sensor. However, in case of protecting the compressor only under the on-off control of the compressor, shock (impact) and noise are generated with the on-off control (for example, the on-off action of the magnetic clutch) of the compressor. It will be understood that the on-off actions of the magnetic clutch correspond respectively to a connection and a disconnection between the compressor and the engine. These connection and disconnection tend to readily be transmitted as shock to the driver, thereby lowering the drivability of the vehicle.

Further, in order to cause the heat pump type air conditioning systems to exhibit a high heating performance, it is required to recover the refrigerant accumulated in the exterior heat exchanger to the compressor thereby using a large amount of the refrigerant for the heating operation of the air conditioning system. In this regard, the above-discussed air conditioning systems of the dual air conditioning type mounted on the one box-type cars and the like have a relatively large volume condenser and a relatively long piping, so that a considerable time is required to recover the refrigerant. Additionally, for example in case of accomplishing the refrigeration and heating operations of only the rear unit, the refrigerant becomes unnecessary for the front unit. Accordingly, if the refrigerant (for the front unit) accumulated in the evaporator and the like are recovered, a large amount of the liquid state refrigerant is supplied to the compressor, thereby causing the fears of compressing the liquid state refrigerant, and of cleaning the inside of the compressor with the liquid state refrigerant. This degrades the reliability of the compressor itself.

BRIEF SUMMARY OF THE INVENTION

It is an object of the present invention to provide an improved heat pump type air conditioning system for an automotive vehicle, by which drawbacks encountered in conventional heat pump type air conditioning systems can be effectively overcome.

Another object of the present invention is to provide an improved heat pump type air conditioning system for an automotive vehicle, which effectively improves drivability of the vehicle while being effectively protected from being damaged, and additionally high in reliability and low in production cost.

A further object of the present invention is to provide an improved heat pump type air conditioning system for an automotive vehicle, which is high in reliability for a compressor itself and for recovery of a refrigerant.

A still further object of the present invention is to provide an improved heat pump type air conditioning system for an automotive vehicle, which includes a refrigerant recovery system by which a large amount of refrigerant can be effectively recovered for a short time, thereby ensuring a high heating performance of the air conditioning system.

An aspect of the present invention resides in a heat pump type air conditioning system (A) for an automotive vehicle. The heat type air conditioning system comprises a first unit (10) including a heater core (11) through which an engine coolant of an engine flows, and a first heat exchanger (12) which forms part of a refrigeration cycle including a compressor (1) and a first condenser (3), a refrigerant circulating in the refrigeration cycle. A second unit (20) is provided including a second condenser (21) and a second heat exchanger (22) which are fluidly connected in parallel with the first heat exchanger (12). A valve (V2) is fluidly connected in series with the second condenser (21) and disposed such that a part of the refrigerant is introduced through the valve into the second condenser (21) and said second heat exchanger (22). A sub-heat exchanger (30) is disposed outside the first and second units and fluidly connected in series with the second heat exchanger (22), the refrigerant flowing from the second heat exchanger (22) being introduced into the sub-heat exchanger to be heated by a part of the engine coolant, the refrigerant discharged from the sub-heat exchanger being returned to the compressor. An electromagnetic clutch (40) is provided such that the compressor (1) is drivably connectable with the engine therethrough, the electromagnetic clutch being engaged to establish a driving connection between the compressor so as to operate the compressor and disengaged to cut the driving connection so as to make the compressor inoperative. A control device (C) is operatively connected to the electromagnetic clutch (40) for controlling the electromagnetic clutch to be disengageable in accordance with a temperature within the air conditioning system (A).

According to this aspect, by virtue of the fact that the electromagnetic clutch is controlled to be disengageable in accordance with the temperature within said air conditioning system, the time cycle of the on-off (engaging and disengaging) actions of the electromagnetic clutch is prolonged thereby reducing the frequency of changeover from the connecting state (between the engine and the compressor) to the disconnecting state (between the engine and the compressor) and vice versa. This improves the drivability of the automotive vehicle on which the air conditioning system is mounted. Additionally, the reduced frequency of the changeover minimizes a pressure variation in the air conditioning system while contributing to protecting the air conditioning system itself.

Another aspect of the present invention resides in a heat pump type air conditioning system for an automotive vehicle. The heat pump type air conditioning system comprises a first unit (110) including a heater core (111) through which an engine coolant of an engine flows, and a first evaporator (112) which forms part of a first refrigeration cycle including a first condenser (103), a first liquid tank (104a) and a first expansion valve (105a) which are fluidly connected in series with each other, the first refrigeration cycle being supplied with a refrigerant discharged from a compressor (101) driven by the engine through a first valve (V11), the compressor being fluidly connected in series with the first evaporator (112). A second unit (120) includes a second condenser (121) and a second evaporator (122) which is fluidly connected in series with the second condenser (121) through a second liquid tank (104b) and a second expansion valve (105b), the second condenser (121), and the second evaporator (122) being fluidly connected in series with the compressor (101) and forming part of a second refrigeration cycle which is supplied with a part of the refrigerant discharged from the compressor (101) through a second valve (V12). A refrigerant recovery line (R1) is fluidly connected in series with the first condenser (103) to introduce the refrigerant discharged from the first condenser (103) into the second refrigeration cycle during a heating operation of the air conditioning system (A).

According to this aspect, by virtue of the refrigerant recovery line for introducing the refrigerant discharged from the first condenser to the second refrigeration cycle during the heating operation of the air conditioning system, the refrigerant to be recovered is returned to the compressor through the second refrigeration cycle, so that the refrigerant is put into its evaporated state and therefore there are no fear of compressing a liquid in the compressor, of arising flowing-out of oil, and of causing rinsing action with the refrigerant. As a result, the compressor 1 can normally operate without lowing the reliability thereof.

A further aspect of the present invention resides in a heat pump type air conditioning system for an automotive vehicle. The heat pump type air conditioning system comprises a compressor (206), an exterior condenser (207) disposed outside a passenger compartment of the vehicle, an interior condenser (205) disposed inside the passenger compartment, a pressure-reducing device (209), and an interior evaporator disposed inside the passenger compartment which are connected in series with each other through a refrigerant piping (212). A bypass passage (213) is formed bypassing the exterior condenser to allow the refrigerant discharged from the compressor (206) to be introduced to the interior condenser (205) bypassing the exterior condenser (207). A flow passage change-over device (220) is provided to introduce the refrigerant discharged from the compressor (206) to the exterior condenser (207) during a refrigeration operation of the air conditioning system and to the bypass passage (213) during a heating operation of the air conditioning system. A refrigerant recovery passage (230) is provided such that the refrigerant stayed in the exterior condenser (207) is returned therethrough to a suction side of the compressor (206), the refrigerant recovery passage (230) being located to connect the outlet side of the exterior condenser (207) and the suction side of the compressor (206). A valve (231) is disposed in the refrigerant recovery passage (230) to be opened to allow the refrigerant to flow through the refrigerant recovery passage and to be closed to prevent the refrigerant from flowing through the refrigerant recovery passage.

According to this aspect, the refrigerant can be recovered in its liquid state from the outlet of the exterior condenser during the heating operation of the air conditioning system.

Accordingly, a large amount of the refrigerant can be recovered for a short time without causing a reverse flow of the refrigerant to the exterior condenser. The amount of the refrigerant within the heating cycle can be always maintained at a suitable level during the heating operation of the air conditioning system. This solves the problems of lowering the heating performance due to the heating operation under a refrigerant-shortage condition and of lowering a lubricating ability, thereby improving the performance and reliability of the air conditioning system.

BRIEF DESCRIPTION OF THE DRAWINGS

In the drawings, same reference numerals (characters) designate same elements and parts throughout all figures, in which.

DETAILED DESCRIPTION OF THE INVENTION

Figure 1:
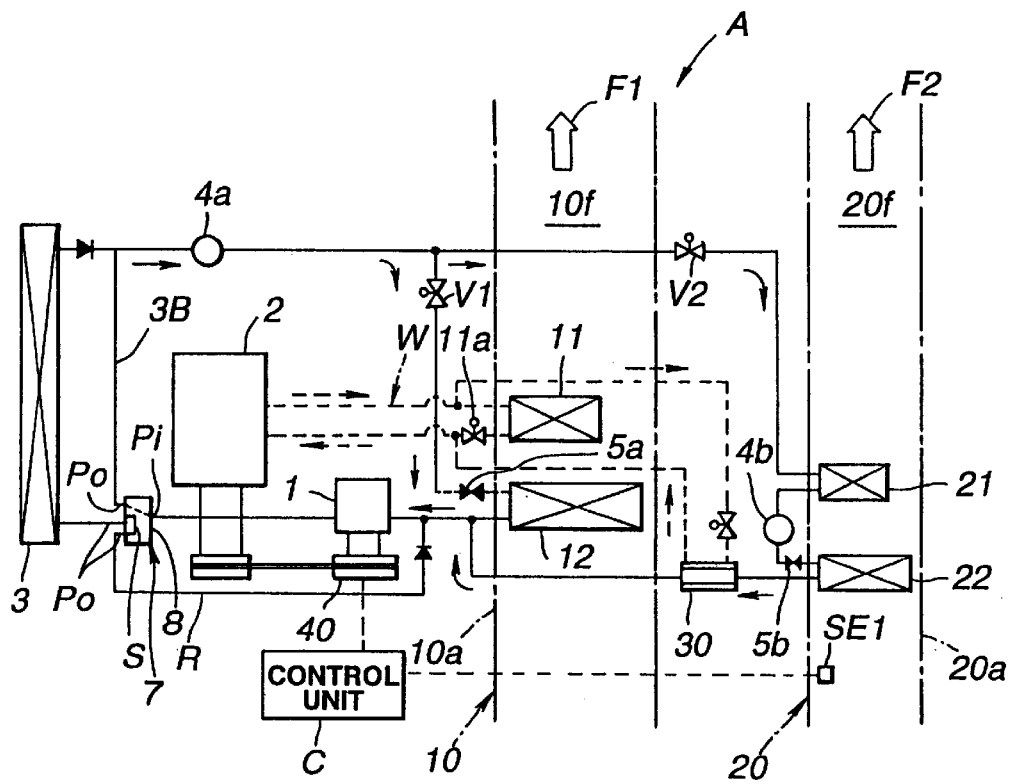
FIG. 1 is a diagrammatic view of a first embodiment of a heat pump type air conditioning system according to the present invention.
Figure 2:
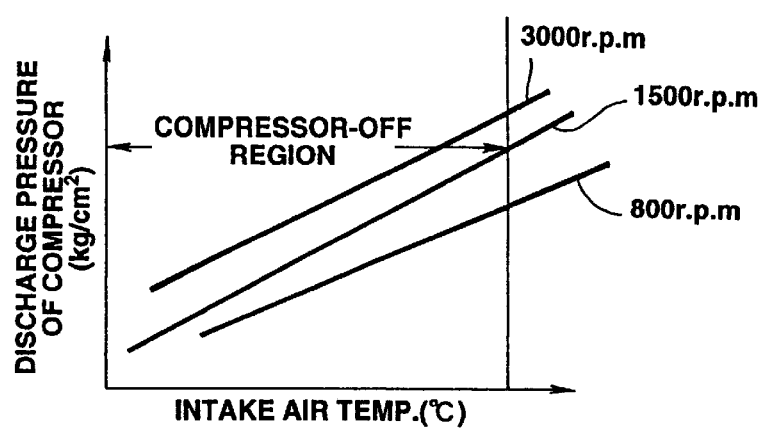
FIG. 2 is a graph showing relative relationships between the temperature of intake air in a rear unit and the discharge pressure of a compressor in the air conditioning system of FIG. 1.
Figure 3:
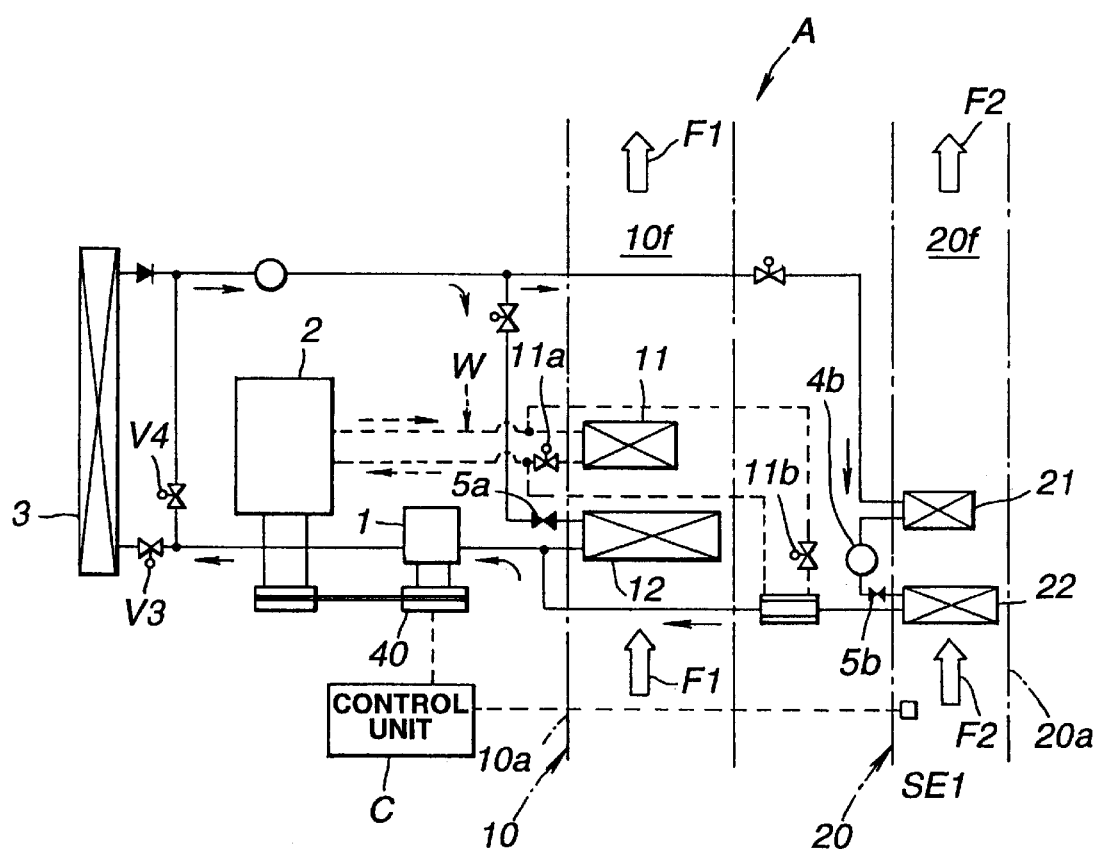
FIG. 3 is a diagrammatic view of a modified example of the first embodiment heat pump type air conditioning system of FIG. 1.

Referring now to FIGS. 1 to 3, a first embodiment of a heat pump type air conditioning system for an automotive vehicle is illustrated by the reference character A. The air conditioning system A of this embodiment comprises front or first unit 10 and a rear or second unit 20. The front unit 10 is arranged to condition air which is selectively drawn from the inside and the outside of a passenger compartment (not shown) of the automotive vehicle under the action of a fan (not shown) and to blow the conditioned air toward a front seat for vehicle passenger. The rear unit 20 is arranged to condition air which is selectively drawn from the inside and outside of the passenger compartment under the action of a fan and to blow out the conditioned air toward a rear seat for vehicle passenger. Accordingly, this air conditioning system A is called a dual air conditioning system.

The front unit 10 includes a casing 10a defining thereinside an air flow passage 10f in which air flows in a direction (air flow direction) indicated by an arrow F1. A heater core 11 and a first heat exchanger 12 are disposed in the air flow passage 10f and located respectively at the downstream and upstream sides relative to the air flow direction F1. The heater core 11 is arranged such that engine coolant (hot water) heated by an engine 2 is circulated therethrough. More specifically, the front unit 10 includes an intake unit (not identified), a cooling unit (not identified) and a heater unit (not identified) which are disposed in the order mentioned in the air flow direction in the casing 10a though not clearly shown. The intake unit includes an intake door (not shown) and the above-mentioned fan. The cooling unit includes the first heat exchanger 12. The heat unit includes an air mixing door (not shown) and the heater core 11. The air mixing door is disposed in front of the heater core 11 and arranged to control the ratio in flow amount between hot air passing through the heater core 11 and cool air bypassing the heater core 11 thereby to prepare air having a predetermined temperature in a region downstream of the heater core 11, and arranged to prevent air from passing through the heater core 11 Additionally, a variety of vents (air blow openings) are formed at the downstream side of the heater core 11 of the heater unit so as to blow the air (having been controlled in temperature) prepared upon mixing the hot air and the cool air toward the front seat inside the passenger compartment, though not shown.

The rear unit 20 includes a casing 20a defining thereinside an air flow passage 20f in which air flows in a direction (air flow direction) indicated by an arrows F2. A second condenser 21 and a second heat exchanger 22 are disposed in the air flow passage 20f and located respectively at the downstream and upstream sides relative to the air flow direction F2. More specifically, the rear unit 20 includes an intake unit (not identified), a cooling unit (not identified) and a heater unit (not identified) which are disposed in the order mentioned in the air flow direction in the air flow passage 21 similarly to the front unit 10, though not clearly shown. The intake unit includes an intake door (not shown) and the above-mentioned fan. The cooling unit includes the second heat exchanger 22. The heater unit includes an air mixing door (not shown) and the second condenser 21. The air mixing door is disposed in front of the second condenser 21 and arranged to control a ratio in flow amount between hot air passing through the second condenser 21 and cool air bypassing the second condenser 21 thereby to prepare air having a predetermined temperature in a region downstream of the second condenser 21, and arranged to prevent air from passing through the second condenser 21. Additionally, a variety of vents (air blow openings) are formed at the downstream side of the second condenser 21 of the heater unit so as to blow air (having been controlled in temperature) prepared upon mixing the hot air and the cool toward the rear seat inside the passenger compartment, though not shown.

In this embodiment, the air conditioning system A includes a first refrigeration cycle or circuit and a second refrigeration cycle or circuit. The first refrigeration cycle is constituted of a compressor 21, a first condenser 3, a liquid tank 4a, a first valve V1, a first expansion valve 5a, and the first heat exchanger 12 (in the front unit 10) which are connected to each other through a piping or lines for a refrigerant. The second refrigeration cycle is constituted of a second valve V2, the second condenser 21 (in the rear unit 20), a liquid tank 4b, a second expansion valve 5b, the second heat exchanger 22 (in the rear unit 20), and a sub-heat exchanger 30 which are fluidly connected to each other through a piping or lines for the refrigerant and in parallel with the first heat exchanger 12. A changeover in flow of the refrigerant between the first and second refrigeration cycles is carried out under combination of the opening and closing actions of the first valve V1 and the second valve V2.

In order to realize a refrigeration operation and a heating operation of the air conditioning system A in the same cycle, a bypass circuit or passage 3B is provided to allow the refrigerant discharged from the compressor 1 to bypass the first condenser 3. A four-way valve 7 is provided to cause flow of the refrigerant discharged from the compressor 1 to be changed over from the first condenser 3 to the bypass circuit 3B and vice versa. In other words, under the action of the four-way valve 7, the refrigerant from the compressor 1 is introduced to the bypass circuit 3B during a heating operation of the air conditioning system A while to the first condenser 3 during a refrigeration operation of the air conditioning system A.

The four-way valve 7 includes a hermetically sealed casing which is formed with one inlet port Pi and three outlet ports Po. A sliding member S is sidably disposed in the casing and arranged to establish communication between selected two of the three outlet ports Po, so that one outlet port Po other than the selected two outlet ports Po is brought into communication with the inlet port Pi. The inlet port Pi of the four-way valve 7 is in communication with the discharge side of the compressor 1, while the three outlet ports Po of the four-way valve 7 are respectively in communication with the inlet of the first condenser 3, the suction side of the compressor 1 (through a refrigerant return circuit or passage R), and the outlet of the first condenser 3 (through the bypass circuit 3B).

The four-way valve 7 is used for effecting the return circuit R. This return circuit R functions to once return a large amount of the refrigerant staying in the first condenser 3 and the like to the compressor 1 in case that the engine coolant cannot be immediately used as a heat source for heating the passenger compartment because the temperature of outside air is low at starting of the heating operation of the air conditioning system A. This enables a large amount of the refrigerant to be used to attain a high performance heating.

Regarding the front unit 10, during the heating operation of the air conditioning system A, the refrigerant discharged from the compressor 1 flows through the four-way valve 7, the bypass circuit 3B for the first condenser 3, the liquid tank 4a, the first valve V1, the expansion valve 5a, and the first heat exchanger 12 in the order mentioned and then returns to the compressor 1. During the refrigeration operation of the air conditioning system A, the refrigerant discharged from the compressor 1 flows through the four-way valve 7, the first condenser 3, the liquid tank 4a, the first valve V1, the expansion valve 5a, and the first heat exchanger 12 in the order mentioned and then returns to the compressor 1.

The heater core 11 is arranged to be supplied with an engine coolant flown from the engine 2 by opening a hot water cock or valve 11a in a hot water circuit or passage W.

Regarding the rear unit 20, both during the refrigeration and heating operations of the air conditioning system A, the refrigerant discharged from the liquid tank 4a flows through the second valve V2, the second condenser 21, the liquid tank 4b, the second expansion valve 5b, the second heat exchanger 22, and the sub-heat exchanger 30 in the order mentioned and returns to the compressor 1.

The sub-heat exchanger 30 is disposed outside the air flow passages 10f, 20f of the front and rear units 10, 20. The engine coolant from the engine 2 is introduced into the sub-heat exchanger 30 by opening a hot water cock or valve 11b in the hot water circuit W, in which a heat exchange is made between the engine coolant and the refrigerant flowing through the sub-heat exchanger 30. In other words, the refrigerant flowing through the sub-heat exchanger 30 is heated by the engine coolant, so that the refrigerant makes its isoentropic change. The refrigerant having make its isoentropic change is returned to the compressor 1 thereby causing the air conditioning system A to exhibit a higher heating performance.

The compressor 1 is drivably connected to the engine 2 through an electromagnetic clutch 40. The electromagnetic clutch 40 makes its on-off actions under its on-off control. More specifically, the electromagnetic clutch 40 is switched ON to be engaged thereby to transmit a rotational power from the engine 2 to the compressor 1, while switched OFF to be disengaged thereby to prevent the rotational power from the engine 2 from being transmitted to the compressor 1. The on-off control of the electromagnetic clutch 40 is made in accordance with a temperature (intake air temperature) of air taken into the air flow passage 20f of the rear unit 20. More specifically, a temperature sensor SE1 is disposed in the air flow passage 20f in the intake unit of the rear unit 20 in order to detect the intake air temperature. A signal (representative of the intake air temperature) is transmitted from temperature sensor SE1 to a control unit C. The control unit C makes the on-off control of the electromagnetic clutch 40 in accordance with the signal from temperature sensor SE1. In other words, when the temperature sensor SE1 detects that the intake air temperature in the rear unit 20 is not lower than a predetermined level (for example, 30° C.), the control unit C controls the electromagnetic valve 40 to be switched OFF to be disengaged. When the electromagnetic valve 40 is disengaged, the compressor 1 is switched OFF to stop its compression action. When the electromagnetic valve 40 is engaged upon being switched ON, the compressor is switched ON to make its compression action. Thus, an on-off control of the compressor 1 is accomplished in accordance with the intake air temperature in the rear unit 20.

According to experiments, as shown in FIG. 2, it has been revealed that a proportional relationship exists between the intake air temperature (° C.) in the rear unit 2 and the discharge pressure ($kg/cm^2$) of the compressor though such a relationship is slightly changed according to engine speed (the revolution speed) of the engine 2. In FIG. 2, three relationships respectively obtained at engine speeds of 800 rpm, 1500 rpm and 3000 rpm are shown. A "Compressor-Off Region" indicated in FIG. 2 represents a region where the compressor 1 is switched OFF to stop the compression action of the compressor 1. This means that the same effect can be obtained by accomplishing the on-off control of the compressor 1 in accordance with the discharge pressure of the compressor 1 and in accordance with the intake air temperature in the rear unit 20.

Here, in case that the on-off control of the compressor 1 is accomplished in accordance with the intake air temperature in the rear unit 20, a response in control is lower than that in case that the on-off control of the compressor 1 is accomplished in accordance with the discharge pressure of the compressor 1. However, a time cycle of the on-off (engaging and disengaging) actions of the electromagnetic clutch 40 is prolonged thereby reducing a frequency of changeover from a connecting state (between the engine 2 and the compressor 1) to a disconnecting state (between the engine 2 and the compressor 1) and vice versa. This improves a drivability of the automotive vehicle on which the air conditioning system A is mounted. Additionally, the reduced frequency of the changeover reduces a pressure variation in the air conditioning system A and therefore is desirable from the view point of protecting air conditioning system A itself.

Therefore, in this embodiment, operation of the air compressor 1 is stopped to stop the heating operation in the rear unit 20 when the intake air temperature in the rear unit 20 reaches the predetermined level.

Next, manner of operation of the thus arranged first embodiment heat pump type air conditioning system A will be discussed hereinafter.

Initial Stage of Heating Operation

When the temperature of the outside air (air outside the vehicle) is low (for example, about −10° C. to about +5° C.) so that the engine coolant has a lower temperature at the starting of the heating operation of the air conditioning system A, it is difficult to use the engine coolant for heating the passenger compartment, employing the heater core 11. At such a time, the refrigerant has been staying inside the first condenser 3 and the like, and therefore a large amount of the refrigerant does not exist in the compressor 1. In case of accomplishing heating for the front and rear seats under this condition, a setting is made as follows: The first and second valves V1, V2 are opened; and the four-way valve 7 is in the state shown in FIG. 1.

When the compressor 1 is switched ON to be operated under this condition, the refrigerant which has been staying mainly in the first condenser 3 and the like is introduced into the suction side of the compressor 1 through the four-way valve 7 and the refrigerant return circuit R so as to be recovered. As a result, a large amount of the refrigerant is discharged from the compressor 1. The high temperature and pressure refrigerant discharged from the compressor 1 flows through the four-way valve 7, the bypass circuit 3B, the liquid tank 4a, the first valve V1, the expansion valve 5a and the first heat exchanger 12 in the order mentioned.

Under starting of the engine 1, the engine coolant whose temperature having been raised to some extent flows into the heater core 11; however, the engine coolant at this time is not sufficiently raised in temperature, and therefore it is not desirable to use the engine coolant to heat the passenger compartment. Accordingly, in such a condition, it is preferable that the hot water cock 11a is closed to prevent the engine coolant from flowing into the heater core 11 or that air in the air flow passage 10f cannot flow through the heater core 11 under the action of the intake door, in which the hot water cock 11b is opened so as to allow the engine coolant to flow through the sub-heat exchanger 30. By this, air introduced from the intake unit into the inside of the front unit 10 is brought into contact with the first heat exchanger 12 in which the high temperature and pressure refrigerant flows, in which heat exchange is made between the air and the refrigerant. Thereafter, the air flows to the downstream side of the air flow passage 10f and blown through the vents to the passenger compartment.

Concerning the rear unit 20, the flow of the high temperature and pressure refrigerant which is bifurcated after flowing out of the liquid tank 4a enters the second condenser 21 through the second valve V2. Here, heat exchange is made between the refrigerant and the air flowing through the air flow passage 20f of the rear unit 20, so that the air to be supplied to the passenger compartment is heated. Thereafter, the refrigerant is condensed and to become medium in temperature and high in pressure, and is subjected to an adiabatic expansion in the second expansion valve 5b, so that the refrigerant becomes further low in temperature and low in pressure. Then, the refrigerant flows into the second heat exchanger 22 which functions as an evaporator. Here, heat exchange is made between the refrigerant and the air flowing through the air flow passage 20f of the rear unit 20, in which the refrigerant evaporates after cooling air and then becomes low in temperature and in pressure to flow into the sub-heat exchanger 30. Accordingly, the air to be supplied to the passenger compartment is first dehumidified and refrigerated by the second heat exchanger 22, and therefore heated by the second condenser 21.

It is preferable that a door (not shown) is disposed in front of the second heat exchanger 22 to prevent the air from passing through the second heat exchanger 22 during the heating operation of the air conditioning system A since it is not desirable that the air is cooled by the second heat exchanger 22 during the heating operation.

The low temperature and pressure refrigerant flowing through the sub-heat exchanger 30 takes in the heat of the engine coolant and rises in temperature to make its isotropic change. The refrigerant having made its isotropic change is returned to the compressor 1 to be again compressed, so that the temperature of the refrigerant discharged from the compressor 1 rises. In this case, the refrigerant to be returned to the compressor 1 is heated in the second heat exchanger 22 by the air and additionally heated in the sub-heat exchanger 30 by the engine coolant, so that a so-called two-stage heating is made to the refrigerant. This causes the air conditioning system A to exhibit a high heating performance while improving an instant or quick heating characteristics for the passenger compartment. Besides, when the thus heated refrigerant is again compressed by the compressor 1, a temperature rise of the refrigerant is further promoted. When the thus heated refrigerant circulates to again reach the first and second heat exchangers 12, 22, the refrigerant is again heated here to obtain a further high temperature thereby causing the air conditioning system A to exhibit a further high heating performance so that high temperature air is blown into the passenger compartment. This tendency is amplified with a time lapse, thus greatly improving the instant or quick heating characteristics of the air conditioning system A.

When the temperature of the engine coolant has risen in the course of the above operation of the air conditioning system A, the heating ability of the sub-heat exchanger 30 is increased while the heating ability of the heater core 11 is increased in connection with the front unit 10, so that considerable high temperature air is blown into the passenger compartment under the combination effect of the increased heating abilities of the sub-heat exchanger and the heater core 11.

Concerning the rear unit 20, the heating ability of the second condenser 21 is increased, and therefore considerably high temperature air is blown into the passenger compartment. It will be understood that the door which has been closed in front of the second heat exchanger 22 is allowed to be opened when the heating ability of the second condenser 21 is increased as discussed above, thereby making it possible to accomplish a so-called dehumidifying heating in which dehumidified air is heated. This defogs a window glass near the rear seat, thereby securing a safety driving of the vehicle.

During Stable Heating Operation

When the temperature of the engine coolant rises to some extent so that the temperature within the passenger compartment rises to some extent, the hot water cock 11b is closed thereby preventing the engine coolant from flowing into the sub-heat exchanger 30. This prevents the refrigerant from being unnecessarily heated thereby to accomplish a normal heating operation of the air conditioning system A.

In this embodiment, when the intake air temperature within the rear unit 20 becomes a level not lower than the predetermined temperature, the temperature sensor SE1 detects the temperature level and provides the signal representative of the temperature level to the control unit C. The control unit C causes the electromagnetic clutch 40 to be switched OFF or disengaged, thereby stopping the compression action of the compressor 1. In contrast, when the intake air temperature within the rear unit 20 lowers to a level lower than the predetermined level, the compression action of the compressor 1 is again made. Thus, the on-off control of the compressor 1 is accomplished in accordance with the temperature of the air flowing through the air flow passage 20f in the rear unit 20. Since the on-off control of the compressor 1 is accomplished in accordance with the intake air temperature in the rear unit 20, a response in control may be lower than that in case that the on-off control of the compressor 1 is accomplished in accordance with the discharge pressure of the compressor 1. However, the time cycle of the on-off (engaging and disengaging) actions of the electromagnetic clutch 40 is prolonged thereby reducing the frequency of changeover from the connecting state (between the engine 2 and the compressor 1) to the disconnecting state (between the engine 2 and the compressor 1) and vice versa. This improves a drivability of the automotive vehicle on which the air conditioning system A is mounted. Additionally, the reduced frequency of the changeover minimizes a pressure variation in the air conditioning system A while contributing to protecting the air conditioning system A itself.

During Refrigeration Operation

In order to accomplish refrigeration for both the front and rear seats, the first and second valves V1, V2 are opened, and the sliding member S of the four-way valve 7 is moved. Under this state, when the compressor 1 is operated to make its compression action, the refrigerant discharged from the compressor 1 flows through the four-way valve 7, the first condenser 3, the liquid tank 4a, the first valve V1, the first expansion valve 5a, and the first heat exchanger 12 in the order mentioned, in the first refrigeration cycle. The flow of the refrigerant is bifurcated at the downstream side of the liquid tank 4a, so that the refrigerant flows through the second valve V2, the second condenser 21, the second expansion valve 5b, the second heat exchanger 22, and the sub-heat exchanger 30 in the order mentioned.

By this, the air introduced into the air flow passage 10f in the front unit 10 is subjected to heat exchange at the first heat exchanger 12 which functions as an evaporator, in which the heat exchange is made between the air and the low temperature and pressure refrigerant flowing through the heat exchanger 12 thereby to provide dehumidified low temperature air. This air is distributed to the side of the heater core 11 and the side of a bypass passage (not shown) bypassing the heater core 11 under the action of the air mixing door, thereby preparing cool air and hot air. The cool air and the hot air are mixed or not mixed to obtain air having a predetermined temperature. The air having the predetermined temperature is blown through the vents into the passenger compartment.

Concerning the rear unit 20, the refrigerant which has been lowered in pressure by the second expansion valve 5b flows into the second heat exchanger 22. The air refrigerated by the second heat exchanger 22 is distributed to the side of the second condenser 21 and to the side of a bypass passage (not shown) bypassing the second condenser 21 under the action of the air mixing door, thereby preparing cool air and hot air. The cool air and the hot air are mixed or not mixed to prepare air having a predetermined temperature. The air having the predetermined temperature is blown through the vents into the passenger compartment.

The refrigerant discharged from the second heat exchanger 22 flows into the sub-heat exchanger 30; however, the refrigerant is returned at this state to the compressor 1 since the hot water cock 11b is closed to prevent the engine coolant from flowing into the sub-heat exchanger 30.

In order to accomplish refrigeration only for the front seat, the second valve V2 is closed In order to accomplish refrigeration only for the rear seat, the first valve V1 is closed.

While only an example of the first embodiment has been shown and described, variations thereto will occur to those skilled in the art within the scope of the present inventive concepts which are delineated by the claims. For example, while the four-way valve 7 and the refrigerant return circuit R have been shown and described as being provided to return the refrigerant staying in the refrigerant circuit to the compressor 1, it will be understood that the air conditioning system A may be operated without returning the staying refrigerant to the compressor 1, in which the four-way valve 7 is replaced with open-and-close valves V3, V4 which are respectively disposed in the inlet of the first condenser 3 and the bypass circuit 3B as shown in FIG. 3.

According to the first embodiment air conditioning system A, by virtue of the fact that the electromagnetic clutch is controlled to be disengageable in accordance with the temperature within said air conditioning system, the time cycle of the on-off (engaging and disengaging) actions of the electromagnetic clutch is prolonged thereby reducing the frequency of changeover from the connecting state (between the engine and the compressor) to the disconnecting state (between the engine and the compressor) and vice versa. This improves the drivabilty of the automotive vehicle on which the air conditioning system is mounted. Additionally, the reduced frequency of the changeover minimizes a pressure variation in the air conditioning system while contributing to protecting the air conditioning system itself.

Figure 4:
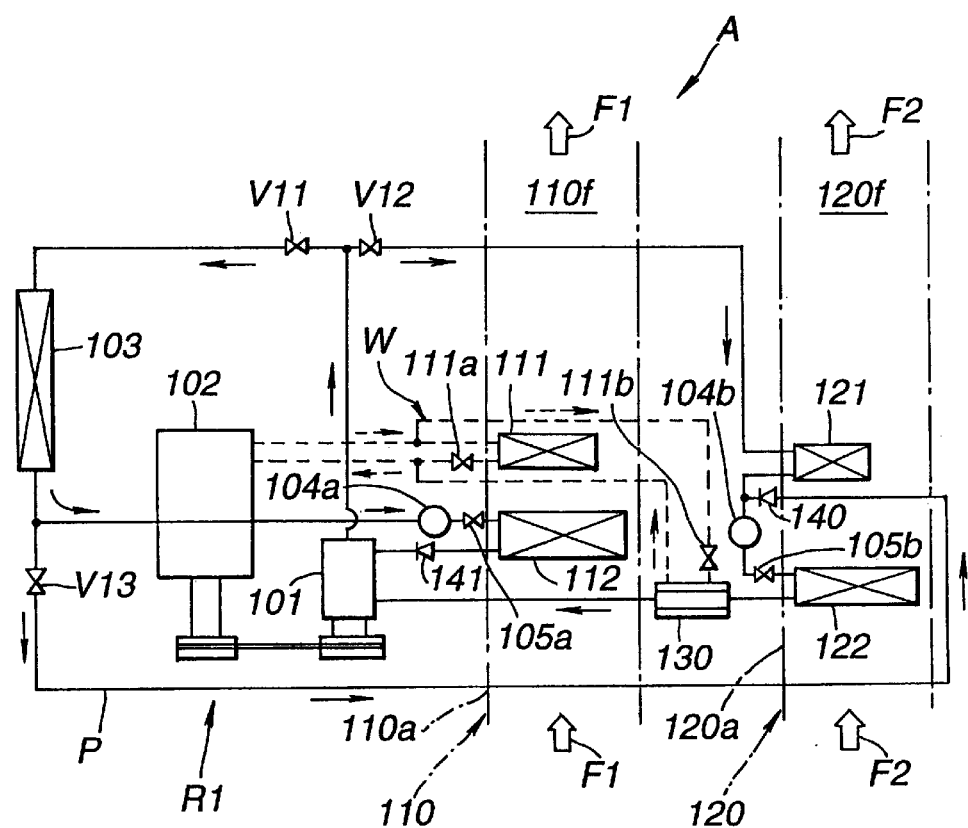
FIG. 4 is a diagrammatic view of a second embodiment of the heat pump type air conditioning system according to the present invention.

FIG. 4 illustrates a second embodiment of the heat pump type air conditioning system A for an automotive vehicle, similar to the first embodiment air conditioning system. The air conditioning system A of this embodiment comprises front or first unit 110 and a rear or second unit 120. The front unit 110 is arranged to condition air which is selectively drawn from the inside and the outside of a passenger compartment (not shown) of the automotive vehicle under the action of a fan (not shown) and to blow the conditioned air toward a front seat for vehicle passenger. The rear unit 120 is arranged to condition air which is selectively drawn from the inside and outside of the passenger compartment under the action of a fan and to blow out the conditioned air toward a rear seat for vehicle passenger. Accordingly, this air conditioning system A is called a dual air conditioning system.

The front unit 110 includes a casing 110a defining thereinside an air flow passage 110f in which air flows in a direction (air flow direction) indicated by arrows F1. A heater core 111 and a first heat exchanger 112 are disposed in the air flow passage 111f and located respectively at the downstream and upstream sides relative to the air flow direction F. The heater core 111 is arranged such that engine coolant (hot water) heated by an engine 102 is circulated therethrough. More specifically, the front unit 110 includes an intake unit (not identified), a cooling unit (not identified) and a heater unit (not identified) which are disposed in the order mentioned in the air flow direction in the casing 110a though not clearly shown. The intake unit includes an intake door (not shown) and the above-mentioned fan. The cooling unit includes the first heat exchanger 112. The heat unit includes an air mixing door (not shown) and the heater core 111. The air mixing door is disposed in front of the heater core 112 and arranged to control the ratio in flow amount between hot air passing through the heater core 111 and cool air bypassing the heater core 111 thereby to prepare air having a predetermined temperature in a region downstream of the heater core 111, and arranged to prevent air from passing through the heater core 111. Additionally, a variety of vents (air blow openings) are formed at the downstream side of the heater core 111 of the heater unit so as to blow the air (having been controlled in temperature) prepared upon mixing the hot air and the cool air toward the front seat inside the passenger compartment, though not shown.

The rear unit 120 includes a casing 120a defining thereinside an air flow passage 120f in which air flows in a direction (air flow direction) indicated by arrows F2. A second condenser 121 and a second evaporator 122 are disposed in the air flow passage 120f and located respectively at the downstream and upstream sides relative to the air flow direction F2. More specifically, the rear unit 120 includes an intake unit (not identified), a cooling unit (not identified) and a heater unit (not identified) which are disposed in the order mentioned in the air flow direction in the air flow passage 120f similarly to the front unit 110, though not clearly shown. The intake unit includes an intake door (not shown) and the above-mentioned fan. The cooling unit includes the second evaporator 122. The heater unit includes an air mixing door (not shown) and the second condenser 121. The air mixing door is disposed in front of the second condenser 121 and arranged to control a ratio in flow amount between hot air passing through the subcondenser and cool air bypassing the second condenser 121 thereby to prepare air having a predetermined temperature in a region downstream of the second condenser 121, and arranged to prevent air from passing through the second condenser 121. Additionally, a variety of vents (air blow openings) are formed at the downstream side of the second condenser 121 of the heater unit so as to blow air (having been controlled in temperature) prepared upon mixing the hot air and the cool toward the rear seat inside the passenger compartment, though not shown.

In this embodiment, the air conditioning system A includes a first refrigeration cycle or circuit (not identified) and a second refrigeration cycle or circuit (not identified). The first refrigeration cycle includes a compressor 101, a first valve V11, a first condenser 103, a first liquid tank 104a, a first expansion valve 105a, and the first evaporator 112 which are connected in series with each other in the order mentioned through a piping or lines for refrigerant. The second refrigeration cycle includes a second valve V12, the second condenser 121, a second liquid tank 104b, a second expansion valve 105b, the second evaporator 122, and a sub-heat exchanger 130 which are connected in series with each other in the order mentioned through a piping or lines for the refrigerant. A changeover operation in flow of the refrigerant between the first and second refrigeration cycles is carried out under the combination of the opening and closing actions of the first valve V11 and the second valve V12. Additionally, a refrigeration operation and a heating operation of the air conditioning system A can be realized in the same cycle.

In this embodiment, a refrigerant recovery circuit or line R1 is provided to introduce the refrigerant discharged from the first condenser 103 into the second refrigerant cycle. Specifically, the refrigerant recovery line R is arranged to return the refrigerant discharged from the first condenser 103 into the second liquid tank 104b. More specifically, the refrigerant recovery line R1 includes a line or passage P through which the outlet of the first condenser 103 and the outlet of the second condenser 121 are fluidly connected with each other. A third valve V13 and a one-way valve 140 are disposed in the passage P. The third valve V13 is opened during the heating operation of the air conditioning system A. The one-way valve 140 is arranged to direct flow of the refrigerant from the first condenser 103 to the second evaporator 122. Accordingly, at the starting of the heating operation of the air conditioning system A, the refrigerant stayed in the first condenser 103 is returned to the second refrigeration cycle thereby accomplishing a high performance heating operation of the air conditioning system A upon using a large amount of the refrigerant.

The heating operation can be accomplished with the front unit 110. In case of the heating operation with the front unit 110, the refrigerant discharged from the compressor 1 flows through the first valve V11, the first condenser 103, the first liquid tank 104a, the first expansion valve 5a and the first evaporator 112 in the order mentioned and then returns to the compressor 1. This flow of the refrigerant is the same as that during the refrigeration operation of the air conditioning system A. During the normal heating operation of the air conditioning system A, a hot water cock or valve 111a in a hot water circuit W is opened to allow engine coolant (relatively high in temperature) flowing out of the engine 102 to be introduced into the heater core 111. The heater core 111 functions to heat the air which has been cooled by the first evaporator 112. It will be understood that the engine coolant of the engine 102 circulates through the hot water circuit W.

During the refrigeration and heating operations of the air conditioning system A, concerning the rear unit 120, the refrigerant whose flow has been bifurcated from the first refrigeration cycle upon opening of the second valve V12 flows through the second condenser 121, the second liquid tank 104b, the second expansion valve 105b, the second evaporator 122 and the sub-heat exchanger 130 in the order mentioned and then returns to the compressor 101.

The sub-heat exchanger 130 is disposed outside the air flow passages 110f, 120f of the front and rear units 110, 120. The engine coolant is introduced from the engine 102 into the sub-heat exchanger 130 by opening the hot water cock 111b, in which heat exchange is made between it and the refrigerant flowing through the sub-heat exchanger 130. That is, in this sub-heat exchanger 130, the refrigerant flowing through the sub-heat exchanger 130 is heated by the engine coolant thereby making its isoentropic change. The engine coolant having made its isoentropic change is returned to the compressor 101 thereby causing the air conditioning system A to exhibit a high heating performance.

During Refrigerant Recovering Operation (Initial Stage of Heating Operation

When the temperature of the outside air (air outside the vehicle) is low (for example, about −10° C. to about +5° C.)

so that the engine coolant has a lower temperature at the starting of the heating operation of the air conditioning system A, it is difficult to use the engine coolant for heating the passenger compartment, employing the heater core 111. At such a time, the refrigerant has stayed inside the first condenser 103 and the like, and therefore a large amount of the refrigerant does not exist in the compressor 101. In case of accomplishing heating for the front and rear seats under this condition, a setting is made, there is the fear of occurring a shortage of the refrigerant. In view of this, first the first and third valves V11, V13 are opened, while the second valve V12 is closed.

When the compressor 101 is operated to make its compression action, a part of the refrigerant stayed in the first condenser 103 flows through the first condenser 103, the first liquid tank 104a, the first expansion valve 105a, and the first evaporator 112 (which form part of the first refrigeration cycle) in the order mentioned and then returns to the compressor 101. That is, a part of the staying refrigerant is evaporated during passage through constituting elements or parts of the first regeneration cycle and recovered to the compressor 101, thereby relatively minimizing the amount of the refrigerant in a liquid state.

The other part of the refrigerant stayed in the first condenser 103 is drawn under the suction of the compressor 101 and flows through the third valve V13, the relatively long passage P and the one-way valve 140 (constituting the refrigerant recovering line R) in the order mentioned, and then is introduced to the second refrigeration cycle.

A part of the thus introduced refrigerant is stored in the second liquid tank 104b for use in the next heating operation, while the other part of the refrigerant flows through the second expansion valve 105b, the second evaporator 122, and the sub-heat exchanger 130 in the order mentioned and flows into the compressor 101. Also in this case, the refrigerant is recovered after passing through the constituting elements or parts of the second refrigeration cycle, and therefore the amount of the refrigerant in a liquid state is minimized. Additionally, even when such a large amount of the refrigerant is returned to the compressor, the refrigerant can be heated to some extent by the engine coolant, thereby further promoting evaporation of the refrigerant so as to minimize the amount of the liquid state refrigerant to be returned.

This establishes a condition in which a large amount of the refrigerant is discharged from the compressor 101 while a large amount of the refrigerant is recovered to the compressor 101. In this refrigerant recovery, the amount of the liquid state refrigerant is relatively small, and therefore there are no fear of compressing a liquid in the compressor 101, of arising flowing-out of oil, and of causing rinsing action with the refrigerant. As a result, the compressor 101 can normally operate thereby providing no fear of lowing the reliability of the compressor 101. Additionally, since the refrigerant recovering line R is constituted of the third valve V13, the passage P and the one-way valve 140, the air conditioning system A is low in production cost and advantageous from the economical view point.

During Heating Operation

In case of carrying out the heating operation, the first valve V11 and the third valve V13 are closed thereby to prevent a backward flow of the refrigerant from the side of the second refrigeration cycle, while the second valve V12 is opened By this, a large amount of the high temperature and pressure refrigerant discharged from the compressor 101 flows through the second valve V12, the second condenser 121, the second liquid tank 104b, the second expansion valve 105b, the second evaporator 122 and the sub-heat exchanger 130 in the order mentioned.

Upon starting the engine 1, the engine coolant whose temperature has been raised to some extent flows into the heater core 111 and the sub-heat exchanger 130; however, the engine coolant at this time is not sufficiently raised in temperature, and therefore it is not desirable to use the engine coolant for heating the passenger compartment. Accordingly, in such a condition, it is preferable for the front unit 110 that the hot water cock 111a is closed to prevent the engine coolant from flowing into the heater core 111 or that air in the air flow passage 110f cannot flow through the heater core 111 under the action of the intake door. At this time, for the rear unit 120, the hot water cock 111b is opened so as to allow the engine coolant to flow through the sub-heat exchanger 130. By this, the heating operation is not accomplished in the side of the front unit 110; however, in the side of the rear unit 120, the heating operation is accomplished to heat the air inside the passenger compartment since the high temperature and pressure refrigerant flows through the second valve V12 to the second condenser 121 so that heat exchange is made between the refrigerant and the air inside the passenger compartment.

The refrigerant becomes medium in temperature and high in pressure upon being condensed after heating the air inside the passenger compartment. Then, the refrigerant is subjected to an adiabatic expansion at the second expansion valve 105b, and therefore becomes further low in temperature and low in pressure. This refrigerant flows into the second evaporator 122, in which heat exchange is made between the refrigerant and the air inside the passenger compartment thereby refrigerating the air. However, it is not preferable that this refrigerated cool air is blown into the passenger compartment, and therefore the cool air is to be discharged to the outside of the vehicle; or a door (not shown) may be provided in front of the second evaporator 122 so as to prevent the air from passing through the second evaporator 122.

Then, the refrigerant which has been evaporated in the second evaporator 122 to become low in temperature and pressure flows into the sub-heat exchanger 130, so that the refrigerant takes in heat of the engine coolant in the sub-heat exchanger 130 and rises in temperature to make its isoentropic change. This refrigerant is thereafter returned to the compressor 101 and again compressed so that the refrigerant discharged from the compressor 101 rises. In this case, the refrigerant to be returned to the compressor 1 is heated by the air in the second evaporator 122 and heated by the engine coolant in the sub-heat exchanger 130, so that a so-called two-stage heating is accomplished for the refrigerant. Accordingly, the air conditioning system A can exhibit a high heating performance while improving an instant or quick heating characteristics of the air conditioning system A. Additionally, when the refrigerant upon being heated is again compressed by the compressor 101, a temperature rise of the refrigerant is further promoted. Then, when the refrigerant again reaches the second evaporator 122, the refrigerant is again heated and becomes further higher in temperature, thus providing a further high heating performance of the air conditioning system A so that high temperature air is blown to the passenger compartment A. This tendency is amplified with a time lapse, thus greatly improving the instant or quick heating characteristics of the air conditioning system A.

When the temperature of the engine coolant has risen in the course of the above operation of the air conditioning system A, the engine coolant is flown into the heater core 111 of the front unit 110 to accomplish the heating operation also at the side of the front unit 110, so that the whole engine compartment is heated. Additionally, the heating ability of the sub-heat exchanger 130 is increased as the heating ability of the engine coolant is increased in connection with the front unit 110, so that considerable high temperature air is blown into the passenger compartment under the combination effect of the increased heating abilities of the sub-heat exchanger and the engine coolant.

It will be understood that the door which has been closed in front of the second evaporator 122 is allowed to be opened when the heating ability of the second condenser 121 is increased, thereby making it possible to accomplish a so-called dehumidifying heating in which dehumidified air is heated. This defogs a window glass near the rear seat, thereby securing a safety driving of the vehicle.

During Stable Heating Operation

When the temperature of the engine coolant rises to some extent so that the temperature within the passenger compartment rises to some extent, the hot water cock 111b of the sub-heat exchanger 130 is closed thereby to prevent the engine coolant from flowing into the sub-heat exchanger 130. This prevents the refrigerant from being unnecessarily heated so as to accomplish a normal heating operation of the air conditioning system A.

During Refrigeration Operation

The refrigeration operation can be accomplished for both the front and rear seats, or only for the front seat. In order to accomplish the refrigeration operation only for the front seat, the first valve V11 is opened, while the second valve V12 and the third valve V13 are closed. Under this condition, when the compressor 101 is operated to make its compression action, the refrigerant discharged from the compressor 1 flows through the first valve V11, the first condenser 103, the first liquid tank 104a, the first expansion valve 105a and the first evaporator 112 in the order mentioned for the first refrigeration cycle. By this, the air introduced through the intake unit into the air flow passage 110f of the front unit 110 is subjected to heat exchange between it and the low temperature and pressure refrigerant in the first evaporator 112 thereby preparing dehumidified low temperature air. This air is distributed to the side of the heater core 111 and the side of a bypass passage (not shown) bypassing the heater core 111 under the action of the air mixing door, thereby preparing cool air and hot air. The cool air and the hot air are mixed or not mixed to obtain air having a predetermined temperature. The air having the predetermined temperature is blown through the vents into the passenger compartment.

Concerning the rear unit 120, the second valve V12 is opened, so that the refrigerant which has been lowered in pressure by the second expansion valve 105b flows also to the second evaporator 122. The air refrigerated by the second evaporator 122 is distributed to the side of the second condenser 121 and to the side of a bypass passage (not shown) bypassing the second condenser 121 under the action of the air mixing door, thereby preparing cool air and hot air. The cool air and the hot air are mixed to prepare air having a predetermined temperature in a downstream region of the second condenser 121, or not mixed. Then, the air is blown through the vents into the passenger compartment.

In this case, the refrigerant discharged from the second evaporator 122 flows into the sub-heat exchanger 130; however, the hot water cock 111b is closed during the refrigeration operation thereby to prevent the engine coolant from flowing into the sub-heat exchanger 130. In order to accomplish refrigeration only for the rear seat, the first valve V11 is closed.

While only an example of the second embodiment has been shown and described, variations thereto will occur to those skilled in the art within the scope of the present inventive concepts which are delineated by the claims. For example, while the heat pump type air conditioning system A has been shown and described as including the sub-heat exchanger 130, the heat pump type air conditioning system may not necessarily include the sub-heat exchanger 130. Additionally, while refrigerant recovering line R has been shown and described as establishing communication between the outlet of the first condenser 103 and the outlet of the second condenser 121, it will be appreciated that the refrigerant recovering line R may take other arrangements, in which it is sufficient that the refrigerant recovering line R is arranged to introduce the refrigerant in the first refrigeration cycle to the second refrigeration cycle.

According to the second embodiment air conditioning system A, by virtue of the refrigerant recovery line for introducing the refrigerant discharged from the first condenser to the second refrigeration cycle during the heating operation of the air conditioning system, the refrigerant to be recovered is returned to the compressor through the second refrigeration cycle, so that the refrigerant becomes its evaporated state and therefore there are no fear of compressing a liquid in the compressor, of arising flowing-out of oil, and of causing rinsing action with the refrigerant. As a result, the compressor 1 can normally operate without lowering the reliability thereof.

Figure 5:
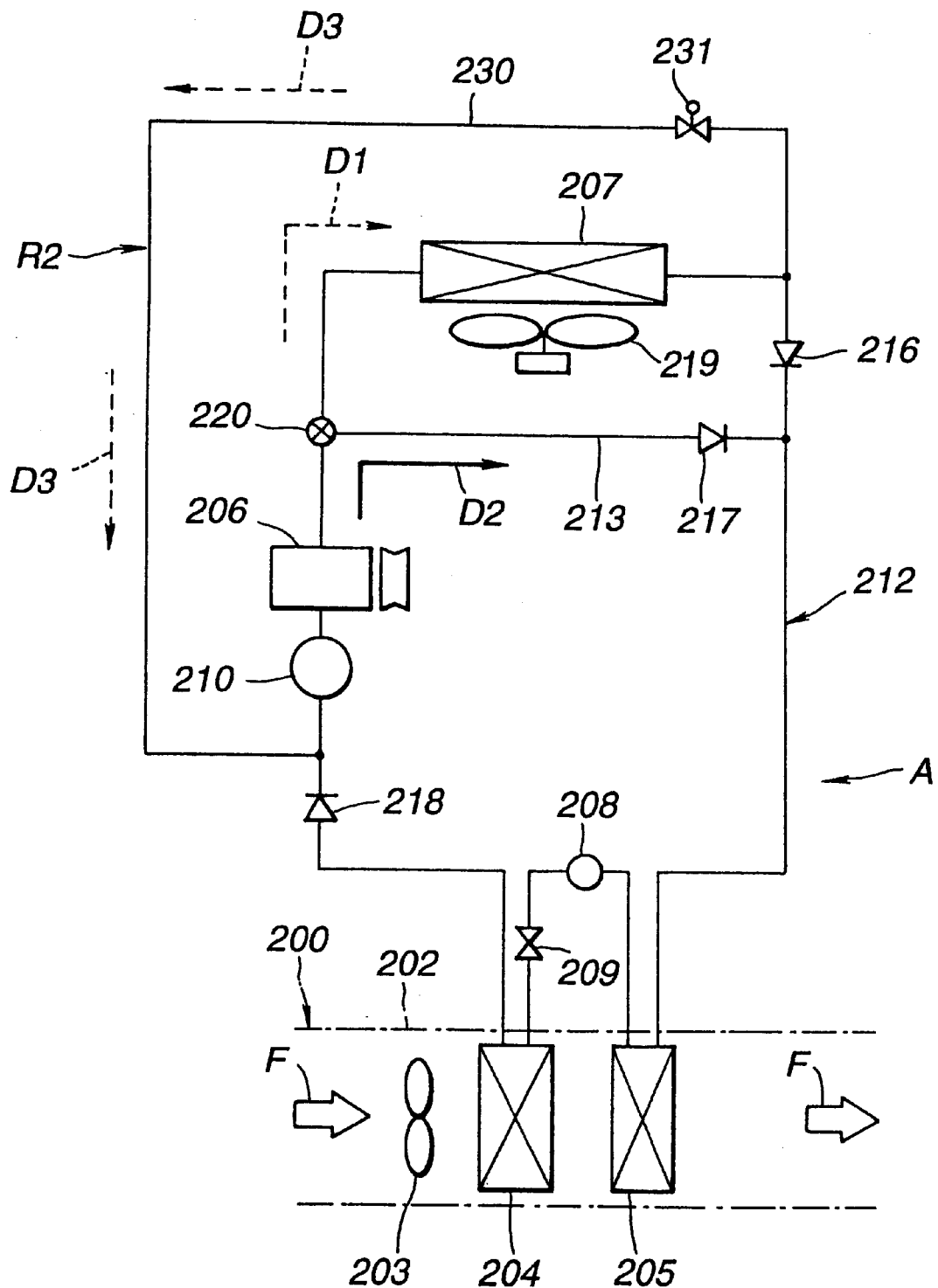
FIG. 5 is a diagrammatic view of a third embodiment of the heat pump type air conditioning system according to the present invention.

FIG. 5 illustrates a third embodiment of the air conditioning system A according to the present invention, similar to the first embodiment air conditioning system. In this embodiment, the air conditioning system A comprises an air conditioning unit 200 which is arranged to condition air which is selectively drawn from the inside and the outside of a passenger compartment (not shown) of the automotive vehicle and to blow the conditioned air toward a predetermined position in the passenger compartment.

The air conditioning unit 200 includes a duct 202 defining thereinside an air flow passage (not identified) in which air flows in a direction (air flow direction) indicated by arrows F under the action of an blower fan 203. An interior evaporator 204 and a sub-condenser 205 as an interior condenser are disposed in the air flow passage and located respectively at the upstream and downstream sides relative to the air flow direction F. The evaporator 204 functions to cool air flowing through the air flow passage upon evaporation of the refrigerant in the evaporator 204. The sub-condenser 205 functions to heat air flowing through the air flow passage upon condensation and liquefaction of the gasified refrigerant mainly during the heating operation of the air conditioning system A. More specifically, the air conditioning unit 200 includes an intake unit (not identified), a cooling unit (not identified) and a heater unit (not identified) which are disposed in the order mentioned in the air flow direction in the air flow passage, though not clearly shown. The intake unit includes an intake door (not shown) and the above-mentioned blower fan 203. The cooling unit includes the evaporator 204. The heater unit includes a rotatable air mixing door (not shown) and the sub-condenser 205. The air mixing door is disposed in front of the sub-condenser 205 and arranged to control a ratio in flow amount between hot air passing through the sub-condenser 205 and cool air bypassing the sub-condenser 205 thereby to prepare air having a predetermined temperature in a region downstream of the sub-condenser 205, and arranged to prevent air from passing through the sub-condenser 205. Additionally, a variety of vents (air blow openings) are formed at the downstream side of the sub-condenser 205 of the heater unit so as to blow air (having been controlled in temperature) prepared upon mixing the hot air and the cool toward the predetermined position inside the passenger compartment, though not shown.

The air conditioning system A makes its cooling and heating operations under a cycle operation for the refrigerant thereby accomplishing cooling and heating (upon dehumidification) for the passenger compartment, under the action of a refrigeration cycle or circuit.

The air conditioning system A comprises a compressor 206 which is disposed outside the air conditioning unit 200 and rotationally driven through a belt (not shown) by an engine (not shown). A main condenser 207 as an exterior condenser is disposed outside the air conditioning unit 200 and adapted to function only during the heating operation of the air conditioning system A. The refrigeration cycle includes the compressor 206, the main condenser 207, the sub-condenser 205, a liquid tank 208, an expansion valve 209 as a pressure-reducing means or device, the evaporator 204, and an accumulator 210 which are fluidly connected with each other a piping or lines 212 for the refrigerant. It will be understood that the refrigerant is sealingly filled in the refrigeration cycle.

The liquid tank 208 functions to separate the gas state refrigerant and the liquid state refrigerant and store therein the liquid state refrigerant so as to discharge only the liquid state refrigerant to the expansion valve 209. This liquid tank 208 also functions to separate air and to remove water and foreign matters. The expansion valve 209 functions to make an expansion of the liquid state refrigerant under a reduced pressure thereby changing the liquid state refrigerant into the mist state refrigerant which is low in temperature and pressure, and functions to automatically control the flow amount of the refrigerant in response to the temperature at the outlet of the evaporator 204 (in case of the expansion valve 209 being of the temperature-responsive type). The accumulator 210 functions to store therein the excess refrigerant and to separate the gas state refrigerant and the liquid state refrigerant so as to return the gas state refrigerant to the compressor 206. The accumulator 110 is relatively large in volume, so that even if the refrigerant is returned in the liquid state to the accumulator 210, the refrigerant is evaporated to be returned to the compressor 206, thereby preventing the compressor 206 from breakage due to compression of liquid.

It will be understood that the liquid tank 208 and the accumulator 210 are partly common in function to each other, and therefore both are not necessarily required. In this regard, according to the present invention, it is preferable to provide at least the accumulator 210 in order to accomplish recovery of the refrigerant (as the liquid state refrigerant) from the outlet of the main condenser 207. Accordingly, both the liquid tank 208 and the accumulator 210 are provided, for example, in a case such as this embodiment in which the temperature-responsive expansion valve 209 is used as the pressure-reducing means. Otherwise, only the accumulator 210 may be provided omitting the liquid tank 208 in case that an electromagnetic valve (not shown) having an orifice is used in place of the temperature-responsive expansion valve 209, in which the electromagnetic valve is a flow amount changeover valve of the type wherein position of a valve member is changed to take either one of a fully opened state and a partly opened state of the valve.

The reference numerals 216, 217, 218 designate respectively check valves to prevent the refrigerant from flowing in a reverse direction. The reference numeral 219 designates a condenser fan for blowing air to the main condenser 207 so as to cool the main condenser 207.

In this embodiment, a three-way valve 220 is provided between the discharge outlet of the compressor 206 and the inlet of the main condenser 207 in order to accomplish the change-over for the condensers to be functioned during the heating operation and the refrigeration operation of the air conditioning system A. That is, the three-way valve 220 functions as flow passage change-over means or device for changing over the flow passage of the refrigerant from one circuit to another circuit. More specifically, the three-way valve 220 has one inlet port and two outlet ports for the refrigerant. The inlet port is connected to the discharge side of the compressor 206, while the two outlet ports are connected respectively to the inlet of the main condenser 207 and the outlet of the main condenser 207 through a bypass passage or pipe 213. By selecting one of the two outlet ports to be communicated with the inlet port, flow of the refrigerant discharged from the compressor 206 is changed over from a refrigeration cycle in which the refrigerant is directed to the main condenser 207 to a heating cycle in which the refrigerant is directly directed to the sub-condenser 205 through the bypass passage 213 and vice versa.

The reference characters D1, D2 designate flow directions of the refrigerant respectively during the refrigeration operation and the heating operation of the air conditioning system A. The reference character D3 designates a refrigerant recovering direction (i.e., a flow direction of the refrigerant to be recovered).

During the refrigeration operation of the air conditioning system A, under the operation of the three-way valve 220, the refrigerant discharged from the compressor 206 is introduced into the main condenser 207. More specifically, the refrigerant discharged from the compressor 206 flows through the three-way valve 220, the main condenser 207, the sub-condenser 205, the liquid tank 208, the expansion valve 209, the evaporator 204, and the accumulator 210 in the order mentioned and then returns to the compressor 206, thus forming the refrigeration cycle. By this, in the evaporator 204, heat exchange is made between the liquid state refrigerant and air in such a manner that air passing through a space around the refrigerant passage is cooled with the liquid state refrigerant which is evaporating, thus refrigerating the passenger compartment. In the main condenser 207, the refrigerant releases to the outside the heat taken in by the evaporator 204 under heat exchange between the refrigerant and the outside air, thereby cooling and condensing the gas state refrigerant to obtain the liquid state refrigerant. At this time, the sub-condenser 205 hardly functions as a heat exchanger.

During heating operation of the air conditioning system A, under operation of the three-way valve 220, the refrigerant discharged from the compressor 206 is introduced directly to the sub-condenser 205 through the bypass passage 213. More specifically, the refrigerant discharged from the compressor 206 flows through the three-way valve 220, the bypass passage 213, the sub-condenser 205, the liquid tank 208, the expansion valve 209, the evaporator 204, and the accumulator 2 10 in the order mentioned and then returns to the compressor 206, without using the main condenser 207, thereby forming the heating cycle. By this, the high temperature and pressure gas state refrigerant which has been discharged from the compressor 206 and bypasses the main condenser 207 is condensed and liquefied in the sub-condenser 205 to release heat, so that air cooled by the evaporator 204 is heated and blown to the passenger compartment thereby heating the passenger compartment. At this time, the evaporator 204 cools and dehumidifies the air taken in, thus achieving a heating operation with dehumidification.

The air conditioning system A of this embodiment comprises a refrigerant recovery system R for returning the refrigerant staying in the main condenser 207 to the suction side of the compressor 206 during the heating operation of the air conditioning system A. The refrigerant recovery system R is arranged to recover the refrigerant from the outlet of the main condenser 207. More specifically, the refrigerant recovery system R includes a refrigerant recovery passage or pipe (line) 230 which is connected at its one end to the outlet piping of the main condenser 207 through a three-way connector (not identified), so that the refrigerant recovery passage 230 is formed branched. An electromagnetic valve 231 is disposed in this refrigerant recovery passage 230 to be opened or closed. The other end of the refrigerant recovery passage 230 is connected to the inlet of the accumulator 2 10 through a three-way connector (not identified), thus forming a circuit for recovering the refrigerant. The electromagnetic valve 231 is provided for the purpose of preventing the refrigerant flowing out of the main condenser 207 from flowing into refrigerant recovery passage 30 during the refrigeration operation.

Figure 9:
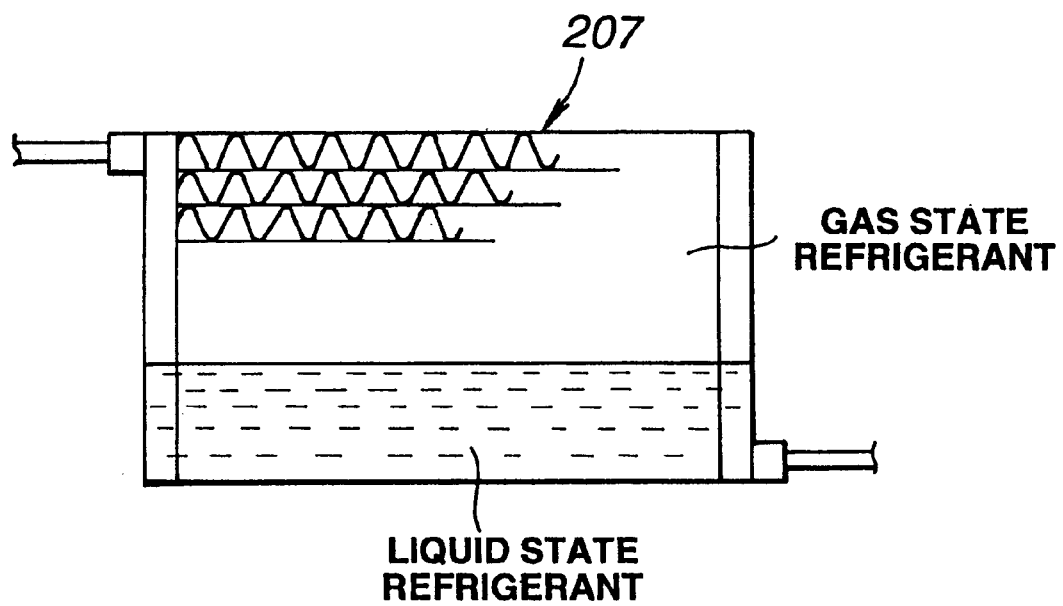
FIG. 9 is a schematic illustration of a main condenser forming part of the heat pump type air conditioning system of FIG. 5.

By thus recovering the refrigerant from the main condenser 207, the refrigerant can be recovered in its liquid state since the liquid state refrigerant is accumulating at the bottom portion of the main condenser 207 as shown in FIG. 9. As a result, the time required for recovering the refrigerant is largely shortened while the amount of the refrigerant to be recovered can be largely increased as compared with a case in which the refrigerant is recovered in its gas state. This has been experimentally confirmed as follows: For example, when the temperature of the outside air was −20° C., not less that 300 g (the generally whole amount of the refrigerant in the main condenser 207) of the refrigerant could be recovered within 90 seconds. Additionally, no reverse flow of the refrigerant could not be found even upon continuation of the recovery of the refrigerant.

Upon taking the above experimental result into consideration, the open-dose control of the electromagnetic valve 231 is carried out as follows: The electromagnetic valve 231 is switched ON to be opened for a predetermined time (for example, 90 seconds) since the initiation of the heating operation of the air conditioning system A so as to allow the refrigerant to flow through the refrigerant recovering passage 230. Upon lapse of the predetermined time (90 seconds) or upon completion of recovering the refrigerant, the electromagnetic valve 231 is switched OFF to block the refrigerant recovering passage 230 so as to stop the flow of the refrigerant through the refrigerant recovering passage 230. Additionally, during the refrigeration operation of the air conditioning system A, the electromagnetic valve 231 is always switched OFF to block the refrigerant recovery passage 230. It will be understood that the above predetermined time for recovering the refrigerant is not limited to 90 seconds, and therefore may be set at a suitable value which is required for obtaining a necessary recovering amount of the refrigerant for each air conditioning system.

According to this embodiment, since recovering the liquid state refrigerant is accomplished from the outlet of the main condenser 207, a large amount of refrigerant can be recovered for a short time without occurrence of reverse flow of the refrigerant to the main condenser 207, thereby shortening the refrigerant recovering time (a time for which the electromagnetic valve 231 is switched ON). Additionally, the necessary and sufficient amount of the refrigerant stayed in the main condenser 207 can be recovered within the refrigerant recovering time, and therefore an appropriate amount of the refrigerant can be always maintained in the heating cycle during the heating operation of the air conditioning system A. This solves the problems of a degraded heating performance and a degraded lubricating characteristics occurred in the heating operation under a too-small amount condition of the refrigerant, thus obtaining the same performance even upon repeated operations of the air conditioning system A.

Figure 6:
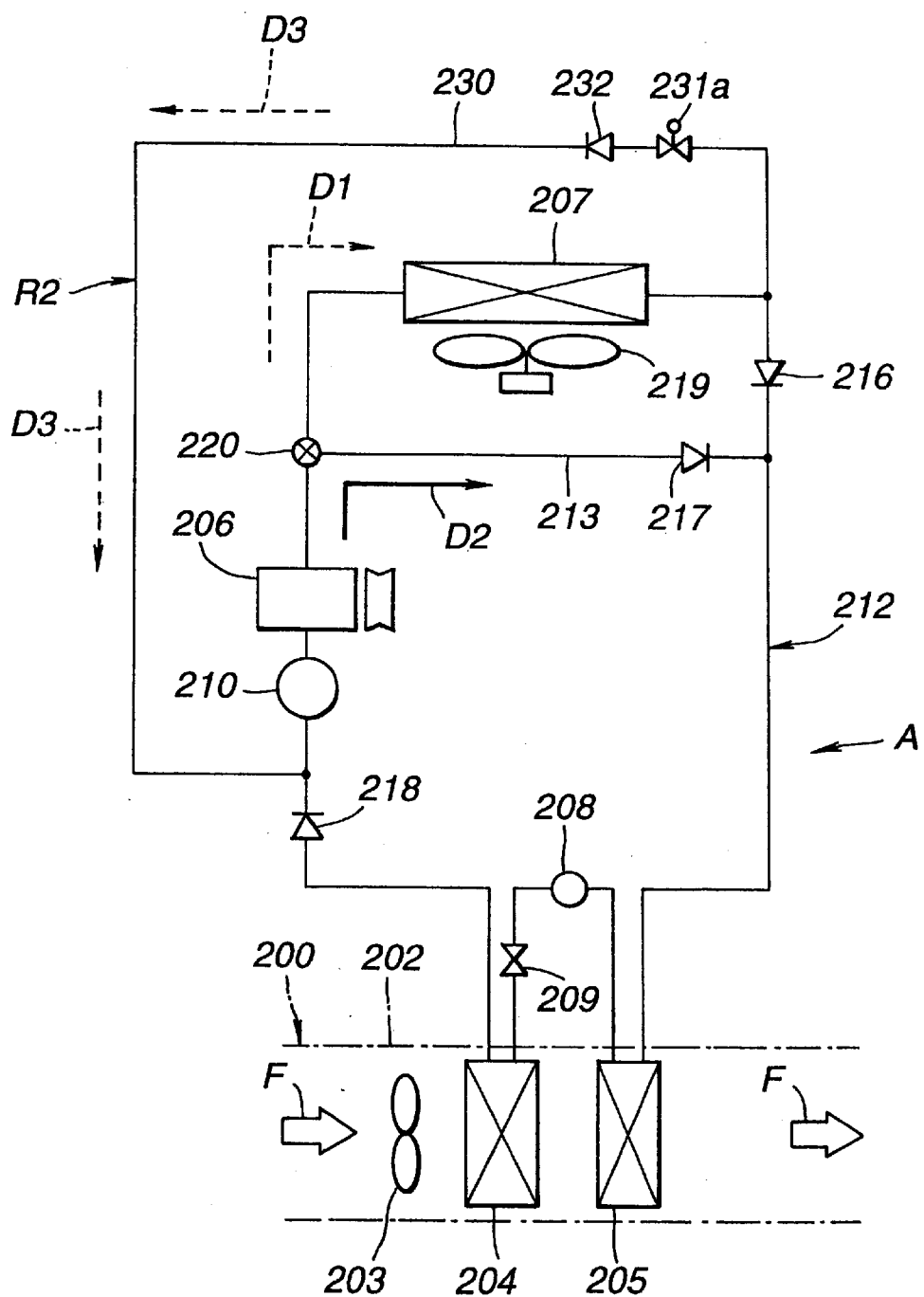
FIG. 6 is a diagrammatic view of a modified example of the third embodiment heat pump type air conditioning system of FIG. 4.

FIG. 6 illustrates a modified example of the third embodiment of the air conditioning system A according to the present invention. This modified example is similar to the third embodiment with the exception that a pilot pressure differential-operated electromagnetic valve 231a is used in place of the electromagnetic valve 231 which is arranged to control opposite flows of the refrigerant therethrough. The pilot pressure differential-operated electromagnetic valve 231a is low in cost and less in electric power consumption as compared with the electromagnetic valve 231 which is directly operated to allow also the reverse flow of the refrigerant therethrough, and therefore the electromagnetic valve 231a is particularly preferably used in an air conditioning system mounted on an electric vehicle.

The pilot pressure differential-operated electromagnetic valve 231a is adapted to be able to control flow of the refrigerant only in one direction, and therefore it is disposed to allow the refrigerant to flow in the refrigerant recovery direction (i.e., the direction of flow of the refrigerant to be recovered) indicated by the arrows D3. The pilot pressure differential-operated electromagnetic valve 231a itself is known, and therefore explanation of the structure of the electromagnetic valve 231a is omitted for the purpose of simplicity of illustration.

The refrigerant recovery system R2 of this example includes the refrigerant recovery passage 230 connecting the outlet of the main condenser 207 and the suction side of the compressor 206 and operates as follows: When the internal pressure (saturated pressure) of the main condenser 207 is higher than the suction pressure of the compressor 206 at starting of the heating operation of the air conditioning system A, the refrigerant stayed in the main condenser 207 is returned in its liquid state from the outlet of the main condenser 207 to the suction side of the compressor 206 through the refrigerant recovery passage 230 so as to be recovered to the heating cycle. Here, since the pilot pressure differential-operated electromagnetic valve 231a is used as a valve disposed in the refrigerant recovery passage 230, there is the possibility of the following shortcomings arising: When the temperature of the outside air is low (for example, at −20° C.) and the temperature within the passenger compartment is about 20° C. under a condition in which the electromagnetic valve 231a in the refrigerant recovery passage 230 is closed (switched OFF) after completion of recovery of the refrigerant, the internal pressure (saturated pressure) of the main condenser 207 may be lowered below the suction pressure of the compressor. In this case, there is the possibility of the refrigerant flowing in the reverse direction from the suction side of the compressor 206 to the side of the main condenser 207 under the action of a reverse pressure differential to the electromagnetic valve 231a so as to allow the reverse flow of the refrigerant through the electromagnetic valve 231a.

In view of this, according to this example, a check valve 232 is disposed in the refrigerant recovery passage 230 and located downstream of the pilot pressure differential-operated electromagnetic valve 231a relative to flow of the refrigerant recovery direction D3. Specifically, the check valve 232 is disposed between the pilot pressure differential-operated electromagnetic valve 231a and the suction side (more specifically, at the inlet of the accumulator 210) of the compressor 206 and is so directed as to block flow of the refrigerant in a direction from the suction side of the compressor 206 to the main condenser 207. By this, even if the refrigerant recovery system R2 using the pilot pressure differential-operated electromagnetic valve 231a is put into a condition where the reverse flow of the refrigerant occurs through the refrigerant recovery passage 230, the reverse flow is prevented from occurrence under the action of the check valve 232, thereby preventing the refrigerant from accumulating in the main condenser 207 owing to leaking of the refrigerant from the suction side of the compressor 206 to the side of the main condenser 207 during the heating operation of the air conditioning system A. This maintains a suitable amount of the refrigerant in the heating cycle during the heating operation of the air conditioning system A.

The other arrangements and operations are the same as those in the third embodiment air conditioning system A, and therefore explanation of those is omitted for the purpose of simplicity of illustration.

Figure 7:
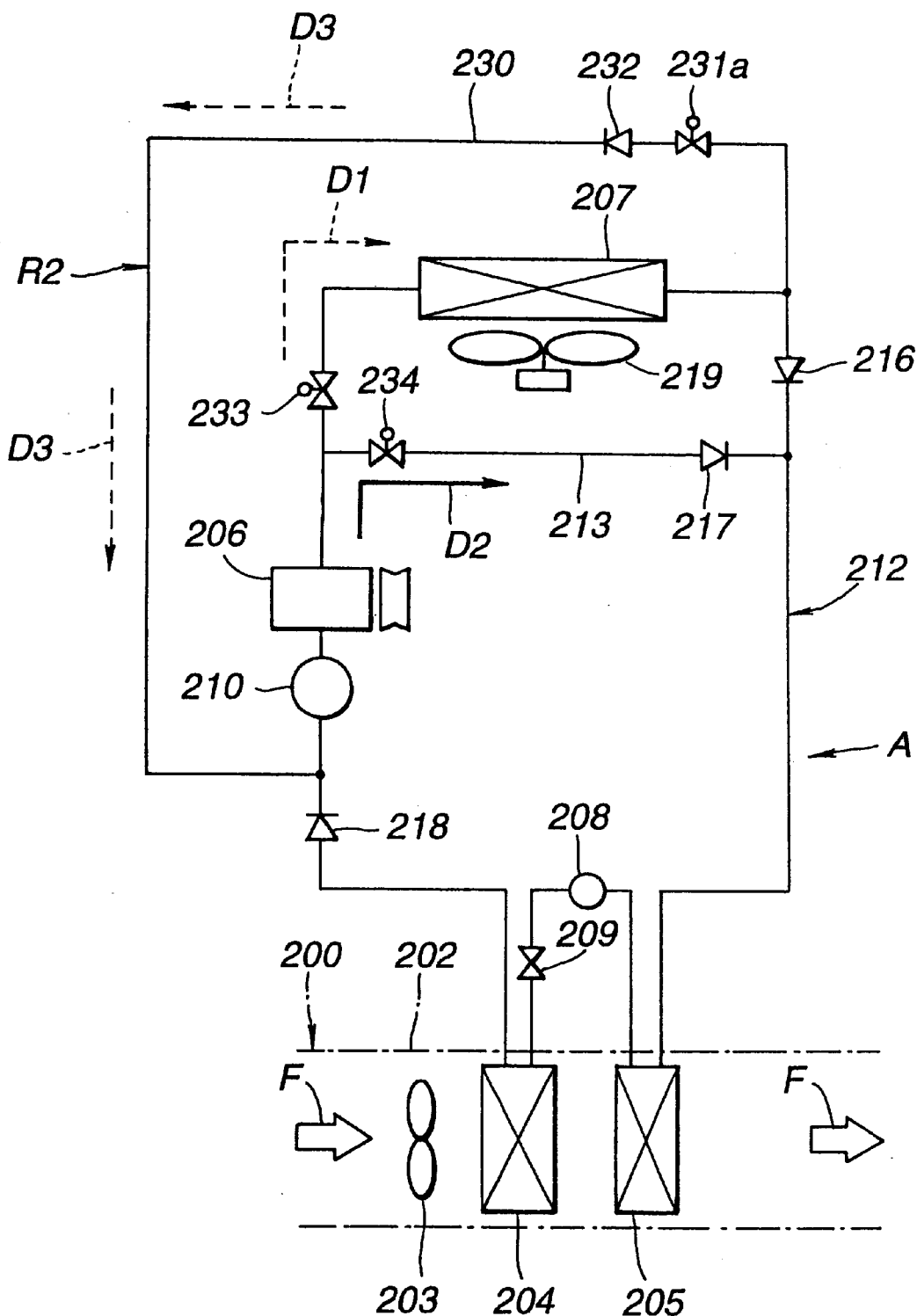
FIG. 7 is a diagrammatic view of another modified example of the third embodiment heat pump type air conditioning system of FIG. 5.

FIG. 7 illustrates another modified example of the third embodiment air conditioning system A according to the present invention. This modified example is similar to the example of FIG. 6 with the exception that two electromagnetic valves 233, 234 are disposed in place of the three-way valve 220 as the flow passage change-over means. For example, the two electromagnetic valves 233, 234 are respectively the pilot pressure differential-operated electromagnetic valves since the flow directions in the lines in which the electromagnetic valves 233, 234 are disposed are always constant, thereby suppressing a cost increase at the minimum value.

In this example, during the refrigeration operation of the air conditioning system A, the electromagnetic valve 233 disposed in the inlet piping of the main condenser 207 is opened (switched ON) while the electromagnetic valve 234 disposed in the bypass passage 213 is closed (switched OFF), so that the refrigerant discharged from the compressor 206 is introduced into the main condenser 207 thereby forming the refrigeration cycle. In contrast, during the heating operation of the air conditioning system A, the electromagnetic valve 233 disposed in the inlet piping of the main condenser 207 is closed (switched OFF) while the electromagnetic valve 234 disposed in the bypass passage 213 is opened (switched ON), so that the refrigerant discharged from the compressor 206 is introduced directly into the sub-condenser 205 through the bypass passage 213 thereby forming the heating cycle.

The other arrangements and operations are the same as those in the modified example of FIG. 6, and therefore explanation of those is omitted for the purpose of simplicity of illustration.

Figure 8:
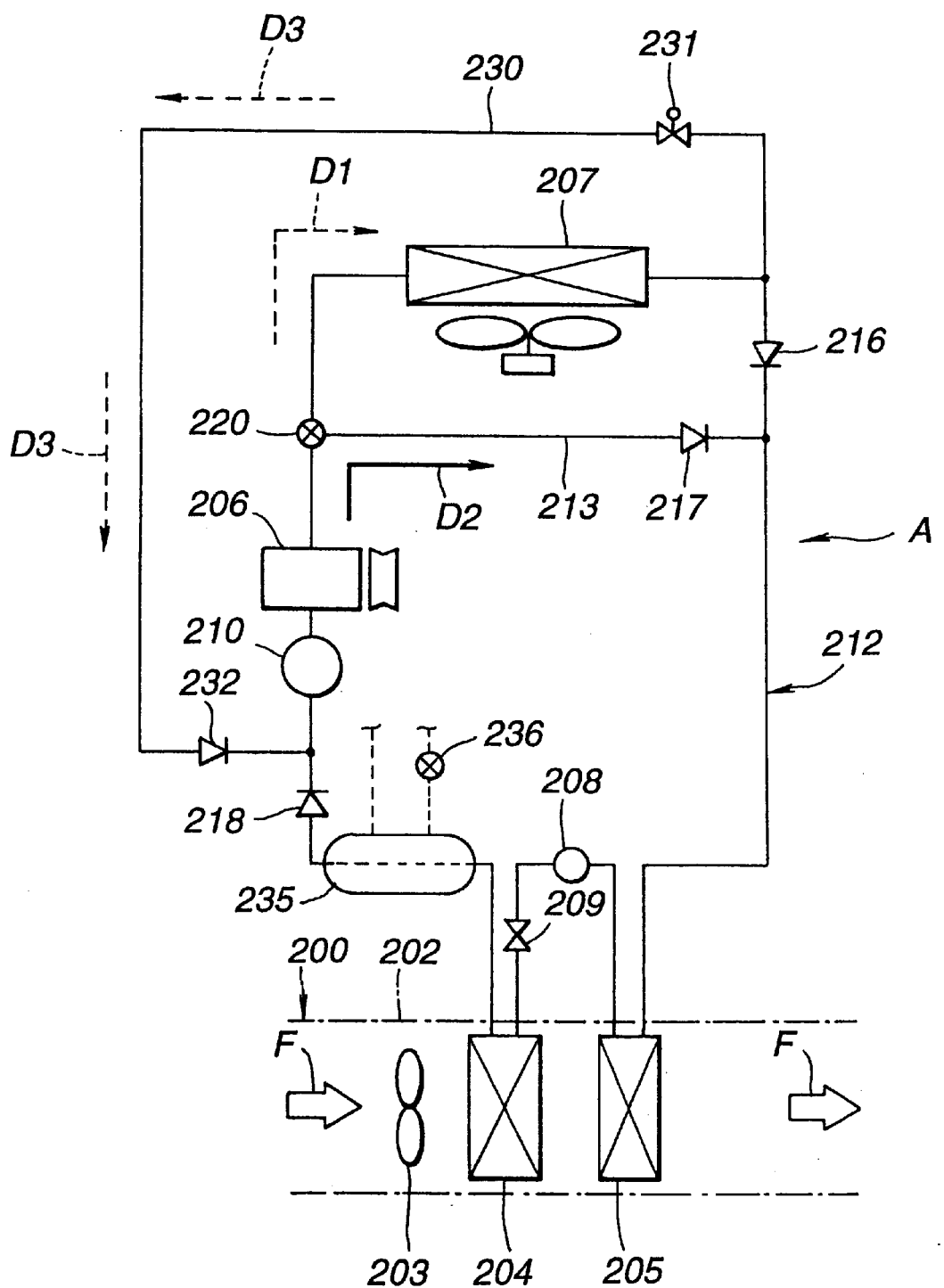
FIG. 8 is a diagrammatic view of a further modified example of the third embodiment heat pump type air conditioning system of FIG. 5.

FIG. 8 illustrates a further modified example of the third embodiment of the air conditioning system A according to the present invention, which is similar to the third embodiment shown in FIG. 5 with the exception that a sub-evaporator or exterior evaporator (located outside the passenger compartment) 235 is disposed in a low pressure-side refrigerant passage between the suction side (more specifically, the inlet of the accumulator 210 and the outlet of the evaporator 204 in order to raise the heating performance of the heat pump system of the air conditioning system A. The sub-evaporator 235 functions to heat the refrigerant flowing through the sub-evaporator under heat exchange between the refrigerant and the engine coolant flowing through the sub-evaporator 235, thus accomplishing heat exchange between hot water and the refrigerant. The reference numeral 236 designates a water valve for allowing the engine coolant to flow through the sub-evaporator 235.

By virtue of the sub-evaporator 235, even if the engine coolant is low in temperature and in a condition to be difficult to be immediately used for heating the passenger compartment under heat exchange between it and air, the refrigerant effectively takes in heat retained in the engine coolant and is heated under heat exchange between it and the engine coolant in the sub-evaporator 235, in which the enthalpy of the refrigerant is increased. Thereafter, the refrigerant returns to the compressor 206 and then again compressed to be increased in pressure by the compressor 206. The refrigerant discharged from the compressor 206 becomes further high in pressure and is supplied to the sub-condenser 205. As a result, the heat releasing performance of the sub-condenser 205 is increased, so that air subjected to heat exchange in the sub-condenser 205 becomes further high in temperature. Accordingly, the air conditioning system A exhibits a further high heating performance while being improved in the instant or quick heating ability for the passenger compartment.

In case that the expansion valve 209 is of the temperature responsive type, it is preferable that a temperature detecting section (not shown) of the expansion valve 209 is disposed at the outlet of the sub-evaporator 235. By this, the flow amount of the refrigerant is controlled in response to the temperature of the refrigerant which has been heated by the sub-evaporator, and therefore a large amount of the refrigerant can circulate during operation of the sub-evaporator 35 thereby promoting a further improvement in the heating performance of the air conditioning system A.

The other arrangements and operations are the same as those in the third embodiment of FIG. 1, and therefore explanation of those is omitted for the purpose of simplicity of illustration.

According to the third embodiment air conditioning system A, the refrigerant can be recovered in its liquid state from the outlet of the exterior condenser during the heating operation of the air conditioning system. Accordingly, a large amount of the refrigerant can be recovered for a short time without causing a reverse flow of the refrigerant to the exterior condenser. The amount of the refrigerant within the heating cycle can be always maintained at a suitable level during the heating operation of the air conditioning system. This solves the problems of lowering the heating performance due to the heating operating under a refrigerant-shortage condition and of lowering a lubricating ability, thereby improving the performance and reliability of the air conditioning system.

What is claimed is:

1. A heat pump type air conditioning system for an automotive vehicle, comprising:
   a first unit including a heater core through which an engine coolant of an engine flows, and a first heat exchanger which forms part of a refrigeration cycle including a compressor and a first condenser, a refrigerant circulating in said refrigeration cycle;
   a second unit including a second condenser and a second heat exchanger which are fluidly connected in parallel with said first heat exchanger;

a valve fluidly connected in series with said second condenser and disposed such that a part of the refrigerant is introduced through said valve into said second condenser and said second heat exchanger;

a sub-heat exchanger disposed outside said first and second units and fluidly connected in series with said second heat exchanger, the refrigerant flowing from said second heat exchanger being introduced into said sub-heat exchanger to be heated by a part of the engine coolant, the refrigerant discharged from said sub-heat exchanger being returned to the said compressor;

an electromagnetic clutch through which said compressor is drivably connectable with the engine, said electromagnetic clutch being engaged to establish a driving connection between the compressor so as to operate said compressor and disengaged to cut the driving connection so as to make said compressor inoperative; and a control device operatively connected to said electromagnetic clutch for controlling said electromagnetic clutch to be disengageable in accordance with a temperature within said air conditioning system.

2. A heat pump type air conditioning system as claimed in claim 1, wherein said control device is adapted to cause said electromagnetic clutch to be disengaged when a temperature of air taken in said second unit reaches a predetermined level.

* * * * *